H. NADERMANN.
Fruit and Jelly Press.

No. 167,013. Patented Aug. 24, 1875.

Attest. Inventor.

UNITED STATES PATENT OFFICE.

HEINRY NADERMANN, OF NEWPORT, KENTUCKY.

IMPROVEMENT IN FRUIT AND JELLY PRESSES.

Specification forming part of Letters Patent No. 167,013, dated August 24, 1875; application filed July 14, 1875.

*To all whom it may concern:*

Be it known that I, HEINRY NADERMANN, of Newport, in the county of Campbell and State of Kentucky, have invented an Improved Fruit and Jelly Press, of which the following is a specification:

My invention relates to hand-presses for fruit, &c.; and consists in a straining utensil to contain the material to be pressed, fitted with a pressure-head, which pressure-head is operated by a handle, turning a nut on a screw projecting from the base of the press. This nut is made in sections, so that it may be expanded so as to slide up and down the screw, or contracted so as to engage the screw and operate the pressure-head.

Figure 1:
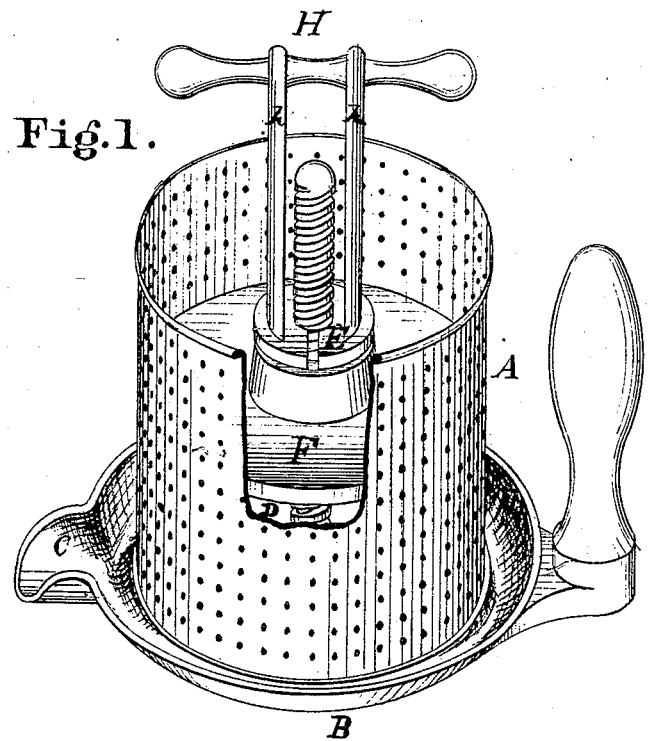
Figure 2:
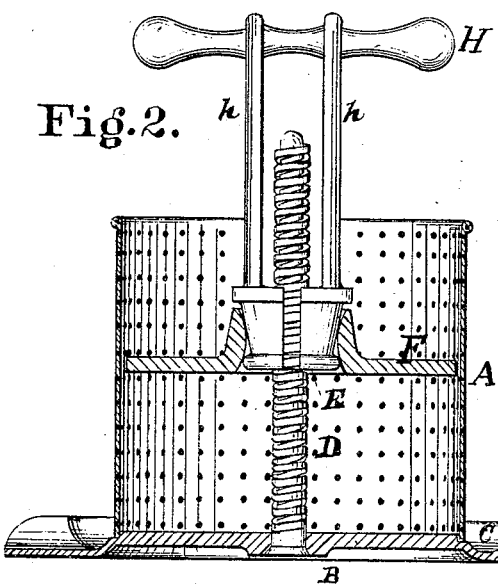

Figure 1 is a perspective view of one of my presses, with a portion of one side cut away. Fig. 2 is a vertical section of the same.

A is a cylindrical vessel, finely perforated, to serve as a straining medium. To the bottom B of this vessel a screw, D, is attached. At the lower end of the handle H there is a nut, E, which is cut through longitudinally, so that one piece is on each of the arms $h\ h$ of the handle, and forms the lower ends of the same. The pressure-head has a conical hole or socket cut in it, into which fits the nut E, which is tapered on the outside, so that when the handle is pressed down into the socket the sections of the nut are brought together and engage the screw D, and when not pressed down the sections will be opened out by the elasticity of the arms $h\ h$, and the nut will slide up and down the screw without engaging it. The nut is slightly enlarged at the bottom, so that when expanded it will hold and lift the pressure-head, and when contracted may be drawn out of the same. The bottom B I make with a groove and spout, as shown at C, for the more convenient handling of the expressed juices.

What I claim is—

1. The combination, in a fruit and jelly press, of screw D and expansible nut E, when constructed and operating substantially as described.

2. The combination of screw D, expansible nut E, and pressure-head F, substantially as described.

3. The combination of screw D, expansible nut E, and handle H, when constructed and operating substantially as described.

4. The combination of perforated cylinder A, screw D, expansible nut E, and pressure-head F, substantially as described.

HEINRY NADERMANN.

Witnesses:
 WM. S. BATES,
 DANIEL S. J. KELLY.